United States Patent
Chiang et al.

(10) Patent No.: US 11,520,452 B2
(45) Date of Patent: Dec. 6, 2022

(54) NOISE REDUCTION TOUCH LIGHT ADJUSTMENT DEVICE AND NOISE REDUCTION METHOD THEREOF

(71) Applicant: Silicon Integrated Systems Corp., Hsinchu (TW)

(72) Inventors: Yi-Feng Chiang, Hsinchu (TW); Cheng-Yi Huang, Hsinchu (TW)

(73) Assignee: Silicon Integrated Systems Corp., Hsinchu (TW)

( * ) Notice: Subject to any disclaimer, the term of this patent is extended or adjusted under 35 U.S.C. 154(b) by 0 days.

(21) Appl. No.: 17/537,536

(22) Filed: Nov. 30, 2021

(65) Prior Publication Data
US 2022/0179521 A1 Jun. 9, 2022

(30) Foreign Application Priority Data
Dec. 7, 2020 (TW) ................. 109143123

(51) Int. Cl.
*G06F 3/044* (2006.01)
*G06F 3/041* (2006.01)

(52) U.S. Cl.
CPC ........ *G06F 3/0446* (2019.05); *G06F 3/04182* (2019.05); *G06F 3/044* (2013.01); *G06F 3/0412* (2013.01); *G06F 2203/04107* (2013.01)

(58) Field of Classification Search
CPC .... G06F 3/0446; G06F 3/0418; G06F 3/0416; G06F 3/04182; G06F 2203/044; G06F 2203/04107; G06F 2203/04112; G06F 1/182
See application file for complete search history.

(56) References Cited

U.S. PATENT DOCUMENTS

| | | | | |
|---|---|---|---|---|
| 2013/0154994 A1* | 6/2013 | Yang | ..................... | G06F 3/0445 345/174 |
| 2014/0104514 A1* | 4/2014 | Wang | ................... | G06F 3/0445 349/12 |
| 2018/0145114 A1* | 5/2018 | Sim | ..................... | H01L 27/3276 |
| 2020/0103993 A1 | 4/2020 | Krah et al. | | |
| 2022/0043535 A1* | 2/2022 | Ke | ........................ | G06F 3/0412 |

FOREIGN PATENT DOCUMENTS

| CN | 104598073 A | 5/2015 |
|---|---|---|
| CN | 110865728 A | 3/2020 |
| TW | I225227 B | 12/2004 |
| TW | 201209474 A | 3/2012 |
| TW | 201619774 A | 6/2016 |

* cited by examiner

*Primary Examiner* — Darlene M Ritchie
(74) *Attorney, Agent, or Firm* — PV IP PC; Wei Te Chung; Ude Lu

(57) ABSTRACT

The present invention discloses a noise reduction touch light adjustment device including a light adjustment film, a capacitive touch panel, a noise reduction film, a glass substrate, a control circuit module, and an alternating current (AC) transformer. The noise reduction film is disposed between the light adjustment film and the capacitive touch panel to lower noise inputted from the AC transformer into the light adjustment film such that the capacitive touch panel is ensured to be operated precisely.

10 Claims, 8 Drawing Sheets

NOISE REDUCTION TOUCH LIGHT ADJUSTMENT DEVICE AND NOISE REDUCTION METHOD THEREOF

CROSS REFERENCE TO RELATED APPLICATIONS

The present application claims the priority of Taiwan Patent Application No. 109143123, filed on Dec. 7, 2020, titled "NOISE REDUCTION TOUCH LIGHT ADJUSTMENT DEVICE AND NOISE REDUCTION METHOD THEREOF", and the disclosure of which is incorporated herein by reference.

FIELD OF INVENTION

The present invention relates to light adjustment device, especially to a noise reduction touch light adjustment device and a noise reduction method thereof that comprises a noise suppressing function able to suppress and avoid enlargement of noise of power inputted by a front end alternating current (AC)transformer by a light adjustment film to further avoid influence of noise to precision of touch operation.

BACKGROUND OF INVENTION

With reference to FIG. 1, FIG. 1 is a schematic structural view of a conventional touch light adjustment device, the touch light adjustment device 90 comprises a light adjustment film (optical switch film) 91, a glass substrate 92, and a capacitor touch panel 93 stacked sequentially to one another, a control circuit module 95 connected to a touch panel through a circuit flexible board 94, and an alternating current (AC) transformer 96 connected to the light adjustment film 91. The AC transformer 96 is further connected to a utility power source 97 to supply the light adjustment film 91 with power. When touch light adjustment device operates, the utility power source has a voltage lowered through the AC transformer to reach a predetermined voltage and is inputted into the device to supply the device with power needed for operation.

However, the power outputted by the AC transformer 96 has noise, and the noise after passing through the light adjustment film would be amplified and inputted into the capacitor touch panel 93 to result in that a coupling capacitor generated from touch operation on the capacitor touch panel 93 is interfered by the noise and therefore interferes with chip signals on the control circuit module 95 such that abnormal phenomenon such as errors of reported touch points occurs on the capacitor touch panel 93, which further influences precision of detection of the coupling capacitor, lowers touch precision, and even failure of touch functions.

In an actual test environment, the above conventional touch light adjustment device is connected to an AC transformer having greater noise, an inputted voltage into the AC transformer is AC100-240V, 50-60 Hz, and an outputted voltage from the AC transformer is AC 48V/2.1A, 60 Hz. An oscilloscope implements detection of a waveform voltage on a coupling capacitor of a surface of the capacitor touch panel, a predetermined voltage of the coupling capacitor is 20V, and a voltage offset value (i.e., noise of power outputted by the AC transformer that is further enlarged by the light adjustment film) detected by the oscilloscope reaches 6.875V so the noise has severely affected the coupling capacitor value generated between a user's finger and the capacitor touch panel during operation of the capacitor touch panel and results in serious decrease of precision of touch operation and even results in failure of touch functions.

SUMMARY OF INVENTION

An objective of the present invention is to provide a noise reduction touch light adjustment device and a noise reduction method thereof that can suppress electrical noise from an alternating current (AC) transformer and enlarged by a light adjustment film to prevent the noise from affecting a coupling capacitor of the capacitor touch panel, thereby improving touch precision of the capacitor touch panel.

To achieve the above objective, the noise reduction touch light adjustment device of the present invention comprises:
  a light adjustment film;
  a capacitor touch panel;
  a noise reduction film disposed between the light adjustment film and the capacitor touch panel and electrically connected to the light adjustment film and the capacitor touch panel, wherein a metal grounding mesh is disposed on the noise reduction film, and the metal grounding mesh is connected to a grounding line;
  a glass substrate disposed between the light adjustment film and the capacitor touch panel and is located adjacent to the noise reduction film; and
  an AC transformer electrically connected to the light adjustment film;
  wherein the noise reduction film is configured to guide noise of power from the AC transformer of the light adjustment film through the metal grounding mesh and the grounding line to an external environment to lower the noise reaching the capacitor touch panel.

In an embodiment of the present invention, the noise reduction film is disposed between the light adjustment film and the glass substrate.

In an embodiment of the present invention, the noise reduction film is disposed between the capacitor touch panel and the glass substrate.

In an embodiment of the present invention, the grounding line of the metal grounding mesh is configured to directly connect the external environment.

In an embodiment of the present invention, the grounding line of the metal grounding mesh is configured to connect the AC transformer and directly connect the external environment through the AC transformer.

In an embodiment of the present invention, the metal grounding mesh comprises a plurality of vertical metal wires and a plurality of horizontal wires intersecting the vertical metal wires.

The present invention also provides a noise reduction method configured to suppress noise of a touch light adjustment device and comprising:
  a device providing step comprising providing a touch light adjustment device, the touch light adjustment device comprises a light adjustment film, a capacitor touch panel electrically connected to the light adjustment film, and an alternating current (AC) transformer electrically connected to the light adjustment film; and
  a noise reduction step comprising disposing a noise reduction film between the light adjustment film and the capacitor touch panel and grounding the noise reduction film to an external environment such that the noise reduction film guides noise of power from the AC transformer of the light adjustment film to the external environment through the grounding line to lower the noise reaching the capacitor touch panel.

In an embodiment of the present invention, t a metal grounding mesh is disposed on the noise reduction film, and the metal grounding mesh is connected to the grounding line.

In an embodiment of the present invention, the grounding line of the metal grounding mesh is configured to directly connect the external environment.

In an embodiment of the present invention, the grounding line of the metal grounding mesh is configured to connect the AC transformer and indirectly connect the external environment through the AC transformer.

In an embodiment of the present invention, the metal grounding mesh comprises a plurality of vertical metal wires and a plurality of horizontal wires intersecting the vertical metal wires.

By the above technical solutions, the noise reduction touch light adjustment device of the present invention and the noise reduction method thereof dispose a layer of a noise reduction film between a capacitor touch panel and a light adjustment film, a metal grounding mesh is disposed on the noise reduction film, and a grounding line extends from the metal grounding mesh such that the grounding line is connected to a grounding end of a power receptacle of a utility power source through the AC transformer, or the grounding line bypasses the AC transformer and is directly connected to the grounding end of the power receptacle of the utility power source, thereby lowering noise generated in the device by inputted power from AC transformer. Furthermore, a layout of metal wires of the metal grounding mesh can be the same as a layout of electrode patterns of indium tin oxide (ITO) conductive layer in the capacitor touch panel, and even can employ a structure the same as that of the ITO conductive layer to skip costs of manufacturing and using different components.

DETAILED DESCRIPTION OF PREFERRED EMBODIMENTS

Figure 1:
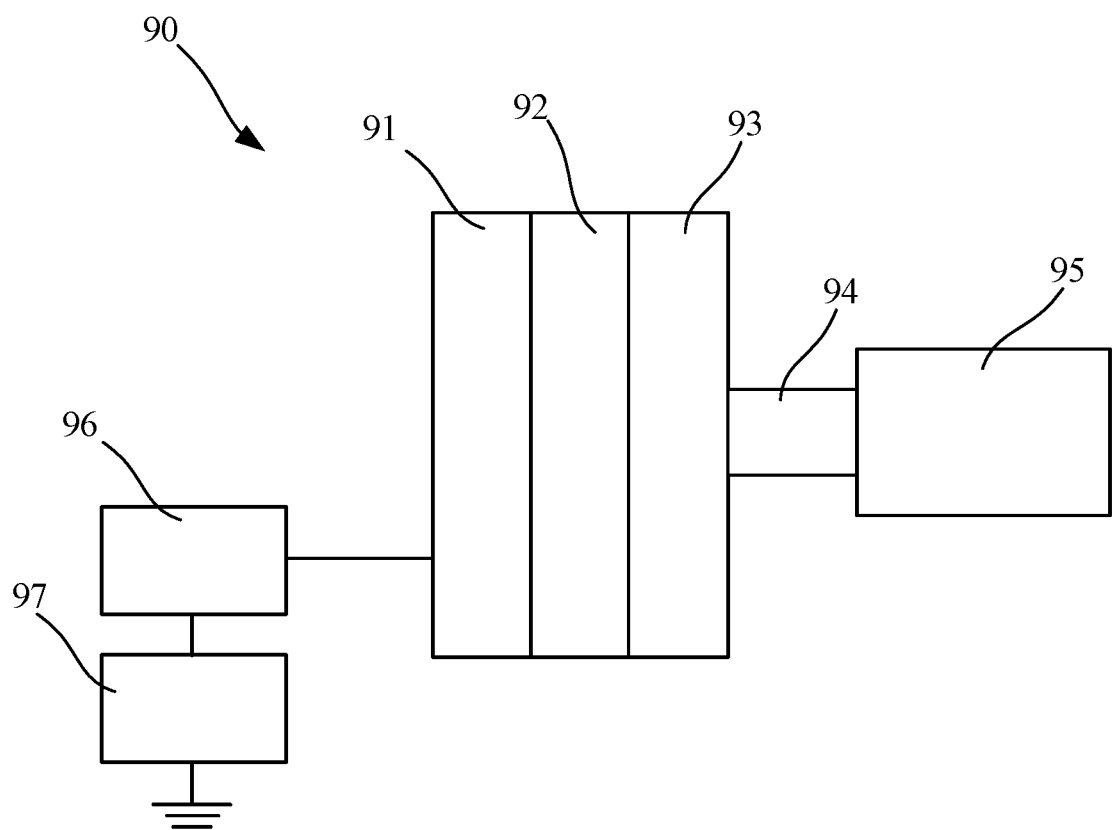
FIG. 1 is a schematic structural view of a conventional touch light adjustment device.
Figure 2:
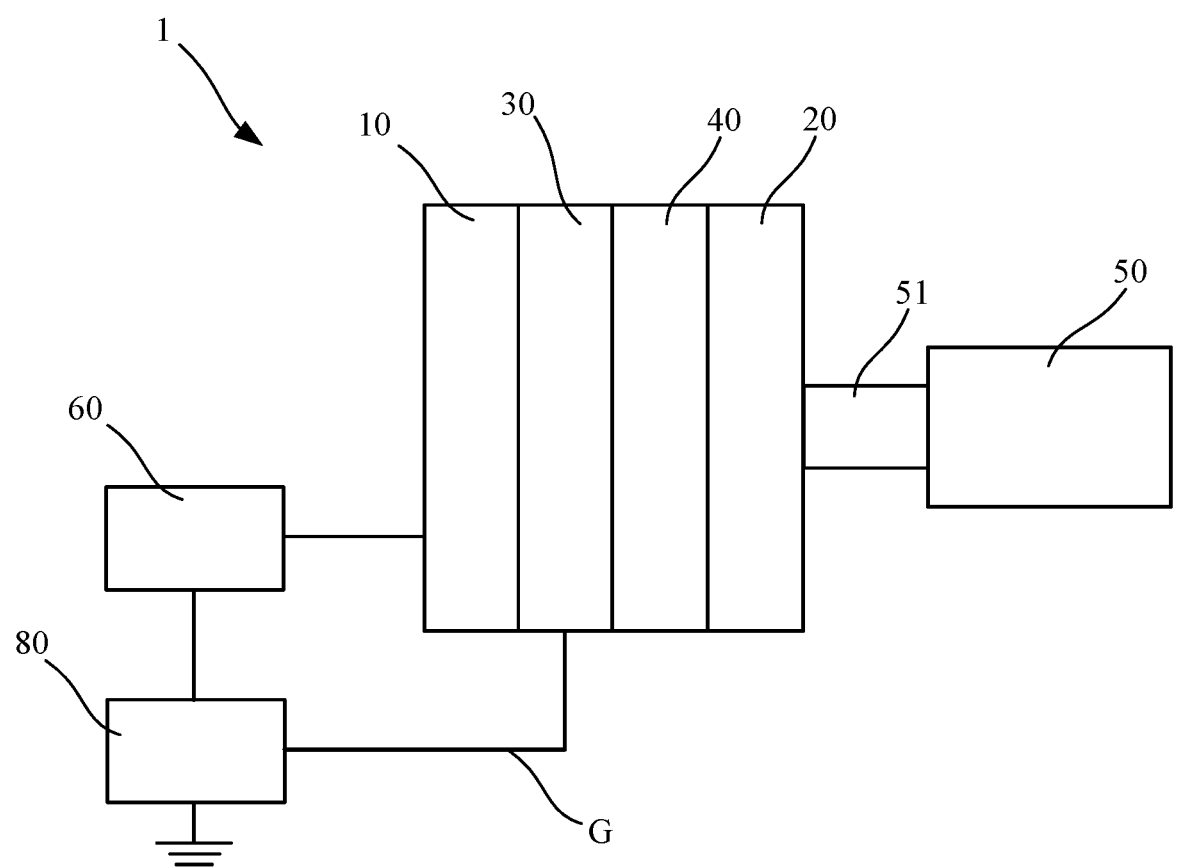
FIG. 2 is a schematic structural view of a touch light adjustment device of first embodiment of the present invention.
Figure 3:
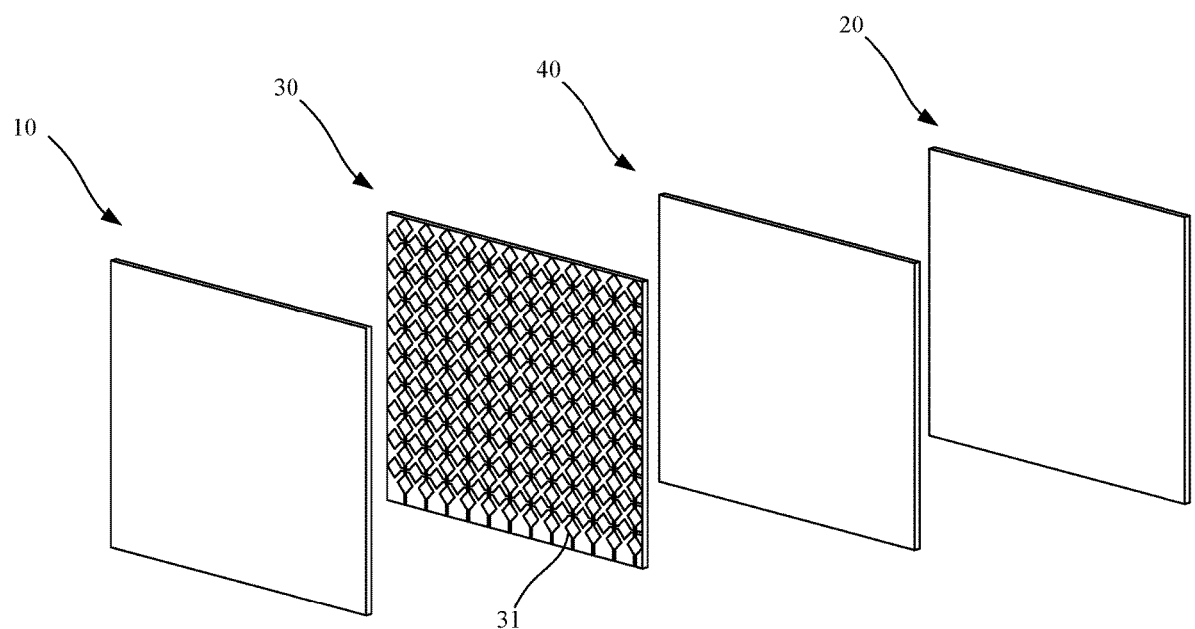
FIG. 3 is an exploded perspective view of a light adjustment film, a noise reduction film, a glass substrate, and a capacitor touch panel of the touch light adjustment device of the first embodiment of the present invention.

With reference to FIGS. 2 to 3, a first embodiment of a touch light adjustment device 1 of the present invention comprises: a light adjustment film 10, a capacitor touch panel 20, a noise reduction film 30, a glass substrate 40, a control circuit module 50, and an AC transformer 60.

The capacitor touch panel 20 is disposed opposite to the light adjustment film 10. Preferably, the capacitor touch panel 20 can comprise an indium tin oxide (ITO) conductive layer, and the ITO conductive layer comprises a plurality of vertical electrode patterns 與 a plurality of horizontal electrode patterns.

The noise reduction film 30 is disposed between the light adjustment film 10 and the capacitor touch panel 20 and is electrically connected to the light adjustment film 10 and the capacitor touch panel 20. A metal grounding mesh 31 is disposed on the noise reduction film 30, and the metal grounding mesh 31 is connected to a grounding line G. The metal grounding mesh 31 can be embedded in the noise reduction film 30, or be disposed on a surface of the noise reduction film 30.

The glass substrate 40 is disposed between the light adjustment film 10 and the capacitor touch panel 20 and is located adjacent to the noise reduction film 30.

The control circuit module 50 is connected to the capacitor touch panel 20 through a circuit flexible board 51 and comprises a control chip, a memory unit, a storage unit. The control chip is configured to receive electrical signals relative to current or voltage of a coupling capacitor generated from capacitor touch panel 20 due to touch operation.

The AC transformer 60 is electrically connected to the light adjustment film 10, and is an AC to AC transformer.

The noise reduction film 30 guides noise in power of the AC transformer 60 of the light adjustment film 10 to an external grounding device 80 through the metal grounding mesh 31 and the grounding line G, for example, to a power receptacle of 110V or 220V of a utility power source, to lower the noise reaching the capacitor touch panel 20.

In the present invention first embodiment, the noise reduction film 30 is disposed between the light adjustment film 10 and the glass substrate 40.

Preferably, the grounding line G of the metal grounding mesh 31 is configured to directly connect the external grounding device 80.

Figure 7:
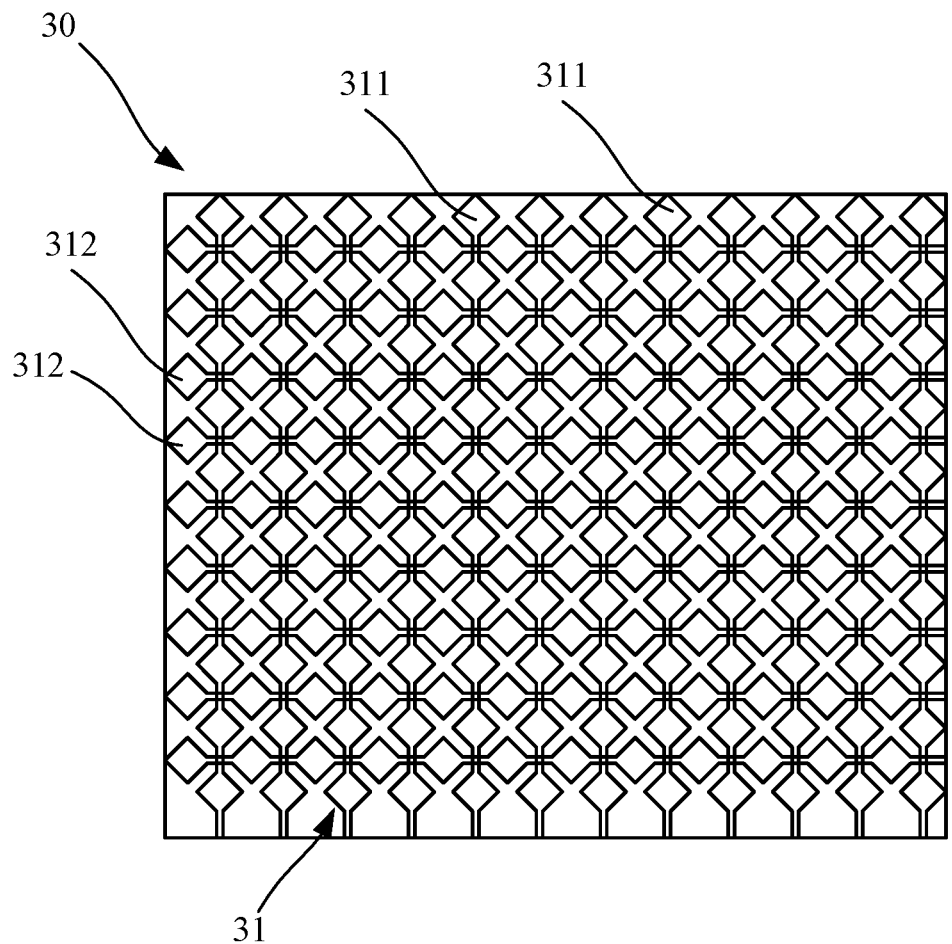
FIG. 7 is a schematic front view of the noise reduction film of the present invention.

With reference to FIG. 7, preferably, the metal grounding mesh 31 comprises a plurality of vertical metal wires 311 and a plurality of horizontal wires 312 intersecting the vertical metal wires 311. Furthermore, structures of the vertical metal wires 311 and the horizontal wires 312 of the metal grounding mesh 31 can be similar to vertical electrode patterns and horizontal electrode patterns of the ITO conductive layer in the capacitor touch panel 20. Even, the structures of the metal grounding mesh 31 are the same as that of the vertical electrode patterns and the horizontal electrode patterns in the ITO conductive layer. Utilizing vertical and horizontal electrode metal patterns the same as those of the ITO conductive layer in the capacitor touch panel 20 can reduce costs due to manufacturing metal wires/electrode patterns using different layer structures.

Figure 4:
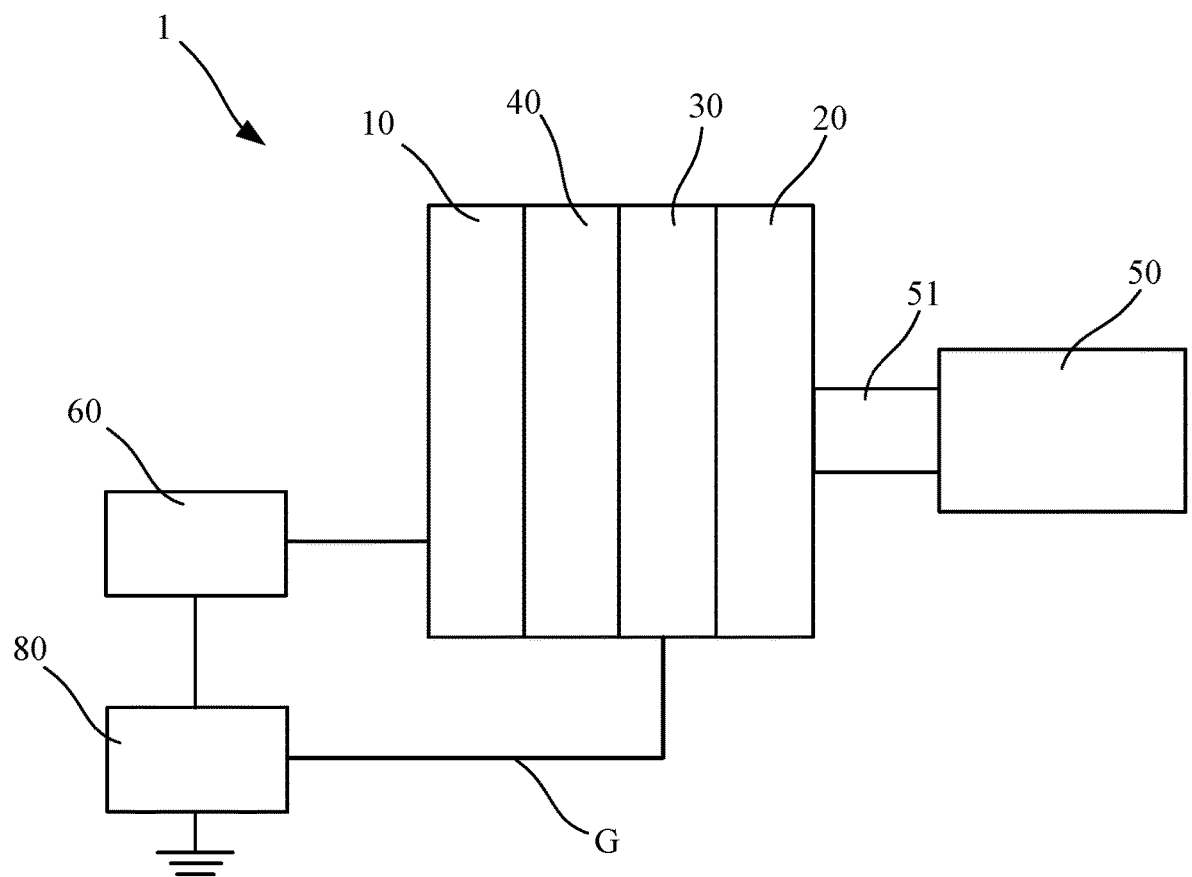
FIG. 4 is a schematic structural view of a second embodiment of the touch light adjustment device of the present invention.
Figure 5:
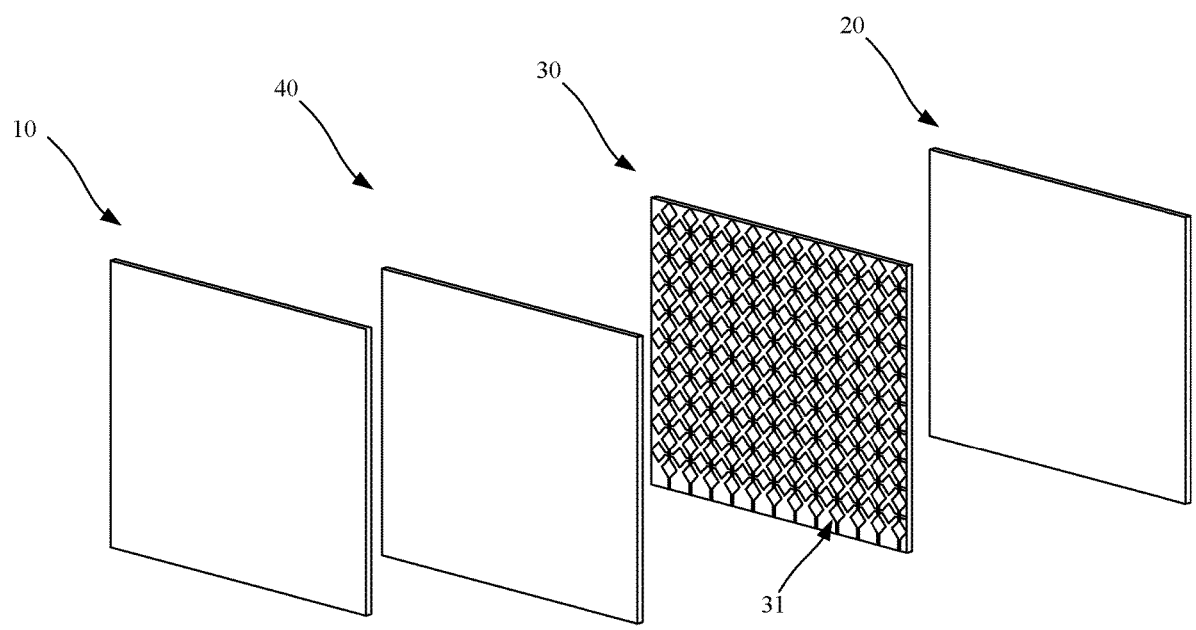
FIG. 5 is an exploded perspective view of the light adjustment film, the noise reduction film, the glass substrate, and the capacitor touch panel of the touch light adjustment device of the second embodiment of the present invention.

With reference to FIGS. 4 and 5, in a second embodiment of the present invention, the noise reduction film 30 is disposed between the capacitor touch panel 20 and the glass substrate 40.

Figure 6:
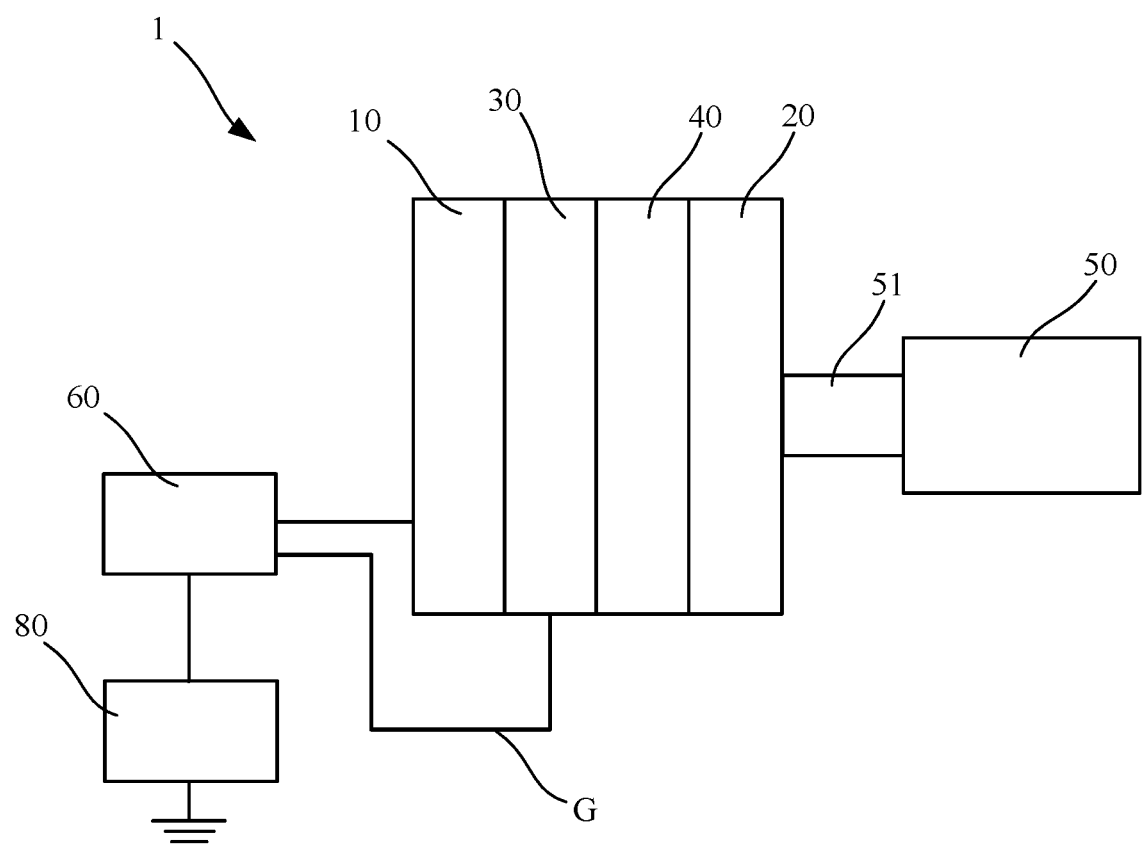
FIG. 6 is a schematic structural view of the touch light adjustment device of a third embodiment of the present invention.

With reference to FIG. 6, in a third embodiment of the present invention, the grounding line G of the metal grounding mesh 31 is configured to connect the AC transformer 60, and indirectly connect the external grounding device 80 through the AC transformer 60.

Under an actual test environment, the above touch light adjustment device of the present invention is connected to an AC transformer 60 with greater noise, an inputted voltage into the AC transformer 60 is AC100-240V, 50-60 Hz, and an outputted voltage from the AC transformer 60 is AC 48V/2.1A, 60 Hz. An oscilloscope implements detection of a waveform voltage on a coupling capacitor of a surface of the capacitor touch panel 20, a predetermined voltage is 20V, and a voltage offset value detected by the oscilloscope (i.e., noise of power outputted by the AC transformer 60 that is further enlarged by the light adjustment film 10) is only 655.2 mV, and the noise is lowered by 90.5% compared to the noise of the conventional touch light adjustment device. Therefore, the noise is not enough to affect a coupling capacitor value generated between a user's finger and the capacitor touch panel 20 during operation of the capacitor touch panel 2 such that the capacitor touch panel 20 can maintain excellent precision of touch operation and normally implement touch functions.

Figure 8:
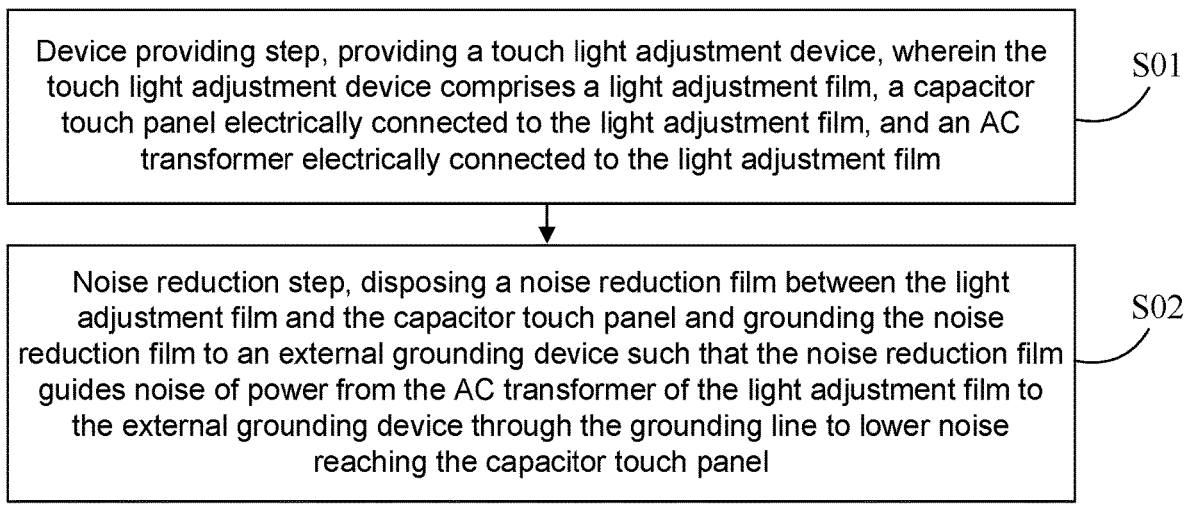
FIG. 8 is a schematic flowchart of a noise reduction method of the present invention.

With reference to FIG. 8, the present invention noise reduction method is configured to suppress noise of a touch light adjustment device, and comprises: a device providing step S01 and a noise reduction step S02.

The device providing step S01 comprises providing the touch light adjustment device as described above. The touch light adjustment device comprises a light adjustment film 10, a capacitor touch panel 20 electrically connected to the light adjustment film 10, and an AC transformer 60 electrically connected to the light adjustment film 10.

The noise reduction step S02 comprises disposing a noise reduction film 30 between the light adjustment film 10 and the capacitor touch panel 20 and grounding the noise reduction film 30 to an external grounding device 80 such that the noise reduction film 30 guides noise of power from the AC transformer 60 of the light adjustment film 10 to the external grounding device 80 through the grounding line G to lower noise reaching the capacitor touch panel 20.

Preferably, a metal grounding mesh 31 is disposed on the noise reduction film 30, the metal grounding mesh 31 is connected to the grounding line G. Preferably, the grounding line G of the metal grounding mesh 31 is configured to directly connect the external grounding device 80.

Alternatively, the grounding line G of the metal grounding mesh 31 is configured to connect the AC transformer 60, and indirectly connect the external grounding device 80 through the AC transformer 60, as shown in FIG. 6.

Preferably, the metal grounding mesh 31 comprises a plurality of vertical metal wires 311 and a plurality of horizontal wires 312 intersecting the vertical metal wires 311.

By the above technical solutions, the noise reduction touch light adjustment device of the present invention and a noise reduction method therefore disposing a layer of a noise reduction film 30 between a capacitor touch panel 20 and a light adjustment film 10. A metal grounding mesh 31 is disposed on the noise reduction film 30, and a grounding line G extends from the metal grounding mesh 31 such that the grounding line G is connected to a grounding end of a power receptacle of a utility power source through an AC transformer 60, or the grounding line G bypasses the AC transformer 60 is directly connected to the grounding end of the power receptacle of the utility power source, which lowers noise generated in a device by an inputted power from the AC transformer 60. Furthermore, a layout of metal wires 311, 312 of the metal grounding mesh 31 can be the same as a layout of electrode patterns of an ITO conductive layer in the capacitor touch panel 20, and can even employ the structure the same as that of the ITO conductive layer to skip costs of manufacturing and using different components.

What is claimed is:

1. A noise reduction touch light adjustment device, comprising:
   a light adjustment film;
   a capacitor touch panel;
   a noise reduction film disposed between the light adjustment film and the capacitor touch panel and electrically connected to the light adjustment film and the capacitor touch panel, wherein a metal grounding mesh is disposed on the noise reduction film, and the metal grounding mesh is connected to a grounding line;
   a glass substrate disposed between the light adjustment film and the capacitor touch panel and is located adjacent to the noise reduction film; and
   an AC transformer electrically connected to the light adjustment film;
   wherein the noise reduction film is configured to guide noise of power from the AC transformer of the light adjustment film through the metal grounding mesh and the grounding line to an external environment to lower the noise reaching the capacitor touch panel.

2. The noise reduction touch light adjustment device according to claim 1, wherein the noise reduction film is disposed between the light adjustment film and the glass substrate.

3. The noise reduction touch light adjustment device according to claim 1, wherein the noise reduction film is disposed between the capacitor touch panel and the glass substrate.

4. The noise reduction touch light adjustment device according to claim 1, wherein the grounding line of the metal grounding mesh is configured to directly connect the external environment.

5. The noise reduction touch light adjustment device according to claim 1, wherein the grounding line of the metal grounding mesh is configured to connect the AC transformer and directly connect the external environment through the AC transformer.

6. The noise reduction touch light adjustment device according to claim 1, wherein the metal grounding mesh comprises a plurality of vertical metal wires and a plurality of horizontal wires intersecting the vertical metal wires.

7. A noise reduction method configured to suppress noise of a touch light adjustment device, comprising:
   a device providing step comprising providing a touch light adjustment device, the touch light adjustment device comprises a light adjustment film, a capacitor touch panel electrically connected to the light adjustment film, and an alternating current (AC) transformer electrically connected to the light adjustment film; and
   a noise reduction step comprising disposing a noise reduction film between the light adjustment film and the capacitor touch panel and grounding the noise reduction film to an external environment such that the noise reduction film guides noise of power from the AC transformer of the light adjustment film to the external environment through the grounding line to lower the noise reaching the capacitor touch panel.

8. The noise reduction method according to claim 7, wherein a metal grounding mesh is disposed on the noise reduction film, and the metal grounding mesh is connected to the grounding line.

9. The noise reduction method according to claim 7, wherein the grounding line of the metal grounding mesh is configured to directly connect the external environment.

10. The noise reduction method according to claim 7, wherein the grounding line of the metal grounding mesh is configured to connect the AC transformer and indirectly connect the external environment through the AC transformer.

* * * * *